(12) United States Patent
Minamimoto

(10) Patent No.: US 12,483,391 B2
(45) Date of Patent: Nov. 25, 2025

(54) INFORMATION PROCESSING SYSTEM

(71) Applicant: Kioxia Corporation, Tokyo (JP)

(72) Inventor: Takeyuki Minamimoto, Urayasu (JP)

(73) Assignee: Kioxia Corporation, Tokyo (JP)

( * ) Notice: Subject to any disclaimer, the term of this patent is extended or adjusted under 35 U.S.C. 154(b) by 68 days.

(21) Appl. No.: 18/627,590

(22) Filed: Apr. 5, 2024

(65) Prior Publication Data

US 2024/0356732 A1 Oct. 24, 2024

(30) Foreign Application Priority Data

Apr. 20, 2023 (JP) ................................. 2023-069573

(51) Int. Cl.
  *H04L 9/08* (2006.01)
(52) U.S. Cl.
  CPC .......... *H04L 9/0819* (2013.01); *H04L 9/0869* (2013.01)
(58) Field of Classification Search
  CPC ............................ H04L 9/0819; H04L 9/0869
  USPC ....................................................... 713/171
  See application file for complete search history.

(56) References Cited

U.S. PATENT DOCUMENTS

| | | | | |
|---|---|---|---|---|
| 9,426,131 | B2* | 8/2016 | Hayashi | H04L 63/0471 |
| 10,848,302 | B2* | 11/2020 | Das | H04W 4/40 |
| 11,502,816 | B2* | 11/2022 | Alwen | H04L 9/0841 |
| 2006/0095975 | A1* | 5/2006 | Yamada | H04L 9/085 |
| | | | | 726/27 |
| 2006/0117178 | A1* | 6/2006 | Miyamoto | G06F 21/6209 |
| | | | | 713/165 |
| 2017/0250804 | A1* | 8/2017 | Kim | H04L 9/0819 |
| 2017/0285976 | A1* | 10/2017 | Durham | G06F 21/64 |
| 2019/0354985 | A1* | 11/2019 | Edwards | G06Q 20/326 |
| 2020/0150177 | A1 | 5/2020 | Portolan | |
| 2021/0297248 | A1* | 9/2021 | Minamimoto | G06F 3/0679 |
| 2024/0146530 | A1* | 5/2024 | Cheng | H04L 9/32 |

FOREIGN PATENT DOCUMENTS

| | | | | |
|---|---|---|---|---|
| CN | 102057617 | B * | 12/2013 | ........... H04L 9/0838 |
| CN | 113965320 | A * | 1/2022 | ........... H04L 9/0866 |
| CN | 114567438 | B * | 6/2025 | ......... H04L 63/0428 |
| JP | 2011-91315 | A | 5/2011 | |
| JP | 5266713 | B2 | 8/2013 | |
| JP | 2016-35637 | A | 3/2016 | |

(Continued)

*Primary Examiner* — Tauqir Hussain
(74) *Attorney, Agent, or Firm* — Oblon, McClelland, Maier & Neustadt, L.L.P.

(57) ABSTRACT

A system encrypts a number by an authentication key to generate first reference data, transmits a result of an authentication process to the host when first encryption data and the first reference data match each other, encrypts or decrypts verification data with a verification key to generate processing data, and transmits the processing data to the host. The host encrypts the number with the authentication key to generate first encryption data, transmits the first encryption data to the memory system, transmits a request regarding an operation in a first mode to the memory system upon reception of a result of the authentication process, transmits the verification key and the verification data read from a second memory to the system, and generates a success notification indicating that an encryptor is working correctly when the processing data and second reference data match each other.

12 Claims, 8 Drawing Sheets

(56) References Cited

FOREIGN PATENT DOCUMENTS

| WO | WO-2017097344 A1 | * | 6/2017 | ........... H04L 9/0891 |
| WO | WO-2019066114 A1 | * | 4/2019 | ........... H04L 63/123 |
| WO | WO-2021208690 A1 | * | 10/2021 | ......... G06F 21/6227 |

* cited by examiner

INFORMATION PROCESSING SYSTEM

CROSS REFERENCE TO RELATED APPLICATIONS

This application is based upon and claims the benefit of priority from the prior Japanese Patent Application No. 2023-069573, filed on Apr. 20, 2023, the entire contents of which are incorporated herein by reference.

FIELD

The embodiments of the present invention relate to an information processing system.

BACKGROUND

Conventionally, it has not been possible to test the encryption function embedded in a memory system from outside.

DETAILED DESCRIPTION

Figure 1:
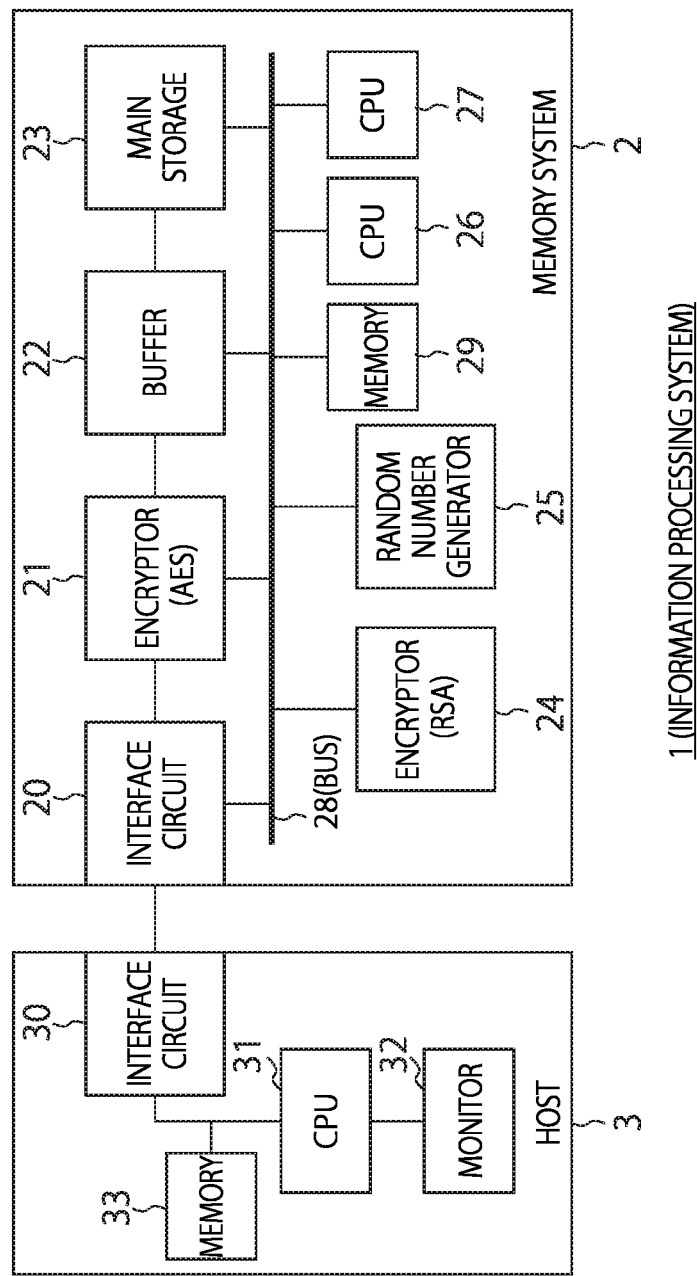
FIG. 1 is a block diagram illustrating a configuration example of an information processing system according to a first embodiment.

In general, according to the embodiment, an information processing system comprises a memory system and a host communicably connected to the memory system. The memory system comprises an encryptor configured to encrypt or decrypt data, a random number generator configured to generate a random number, and a first memory configured to store therein an authentication key. The host comprises a second memory configured to store therein the authentication key, a verification key as an encryption key, verification data as a plaintext or a ciphertext, and second reference data generated by encrypting or decrypting the verification data with the verification key. The memory system transmits the random number to the host, encrypts the random number with the authentication key in order to generate first reference data. The memory system transmits a result of an authentication process to the host and receives a request regarding an operation mode from the host, when received first encryption data and the first reference data match each other. The memory system encrypts or decrypts received verification data with received verification key in order to generate processing data, and transmits the generated processing data to the host. The host encrypts the received random number with the authentication key in order to generate the first encryption data, transmits the generated first encryption data to the memory system. The host transmits a request regarding an operation in a first mode to the memory system and transmits the verification key and the verification data read from the second memory to the memory system, when the host received a result of the authentication process. The host generates a success notification indicating that the encryptor is working correctly when the received processing data and the second reference data match each other. Hereinafter, devices of the present disclosure will be described with reference to the drawings. The present invention is not limited to the embodiments.

In the present specification and the drawings, elements identical to those described in the foregoing drawings are denoted by like reference characters and detailed explanations thereof are omitted as appropriate.

An embodiment of the present invention will now be explained below with reference to the drawings. In the specification and the drawings, identical elements are denoted by like reference signs.

FIG. 1 is a block diagram illustrating a configuration example of an information processing system 1 according to a first embodiment.

The information processing system 1 includes a memory system 2 and a host 3. The memory system 2 and the host 3 are communicably connected to each other via an interface circuit 20 and an interface circuit 30.

The memory system 2 is an SSD (Solid State Drive) or an HDD (Hard Disk Drive), for example. The memory system 2 receives data from outside via the interface circuit 20. Further, the memory system 2 transmits data to outside via the interface circuit 20.

The host 3 is an external information processing device of the memory system 2. The host 3 is a server or a PC (Personal Computer), for example. The host 3 is connected to the memory system 2. The host 3 transmits data to the memory system 2 via the interface circuit 30. Further, the host 3 receives data from the memory system 2 via the interface circuit 30. Upon reception of a result of an authentication process from the memory system 2, the host 3 transmits a request regarding an operation mode to the memory system 2. The request regarding an operation mode is, for example, a request regarding an operation in a first mode or a request regarding an operation in a second mode. The authentication process, the first mode, and the second mode are described later.

The memory system 2 includes the interface circuit 20, an encryptor 21, a buffer 22, a main storage 23, an encryptor 24, a random number generator 25, a CPU (Central Processing Unit) 26, a CPU 27, a bus 28, and a memory 29. The memory system 2 may be constituted with a single semiconductor chip. Alternatively, the memory system 2 may be constituted with a module having a plurality of semiconductor chips assembled therein.

The interface circuit 20 receives data from outside. Further, the interface circuit 20 transmits data to outside.

The encryptor 21 is an encryptor complying with the AES (Advanced Encryption Standard), for example. The encryptor 21 is a logic circuit, for example. The encryptor 21 performs encryption or decryption.

The buffer 22 is a rewritable memory. The buffer 22 is a RAM (Random Access Memory), for example. The buffer 22 temporarily holds encryption data encrypted in the encryptor 21 or the encryptor 24.

The main storage 23 is a non-volatile memory. The main storage 23 is a NAND flash memory, for example. The main storage 23 stores therein encryption data temporarily held in the buffer 22.

The encryptor 24 is an encryptor complying with the RSA (Rivest-Shamir-Adleman) system, for example. The encryptor 24 is a logic circuit, for example. The encryptor 24 performs encryption or decryption.

The random number generator 25 is a device that generates random numbers, for example. The random number generator 25 generates random numbers.

The CPU 26 is an arithmetic processing unit. The CPU 26 controls the interface circuit 20, the encryptor 21, the encryptor 24, the buffer 22, and the random number generator 25. Authentication on the host 3 is a process in which the memory system 2 approves the host 3 to perform verification on the encryptor 21 or the encryptor 24 in the memory system 2. Verification on the encryptor 21 and verification on the encryptor 24 are processes in which the host 3 verifies whether the encryptor 21 and the encryptor 24 can encrypt data correctly.

The CPU 27 is an arithmetic processing unit. The CPU 27 is used for processes other than authentication on the host 3, verification on the encryptor 21, and verification on the encryptor 24. For example, when data is written in the main storage 23, the CPU 27 controls the interface circuit 20, the encryptor 21, the buffer 22, the main storage 23, the encryptor 24, and the random number generator 25. Further, when data is read from the main storage 23, the CPU 27 controls the interface circuit 20, the encryptor 21, the buffer 22, the main storage 23, the encryptor 24, and the random number generator 25.

The bus 28 is a line that communicably connects the interface circuit 20, the encryptor 21, the buffer 22, the main storage 23, the encryptor 24, the random number generator 25, the CPU 26, and the CPU 27 with one another.

The memory 29 is a rewritable memory. The memory 29 is a RAM, for example. The memory 29 stores therein an authentication key and a verification key. The authentication key is an encryption key used for encrypting data. The verification key is an encryption key used for encrypting or decrypting data that is used for verification on the encryptor 21 or verification on the encryptor 24.

The host 3 includes the interface circuit 30, a CPU 31, a monitor 32, and a memory 33. The host 3 may be constituted with a single processor or a plurality of processors, where the processor is a CPU, for example.

The interface circuit 30 transmits data to outside. Further, the interface circuit 30 receives data from outside.

The CPU 31 is an arithmetic processing unit.

The monitor 32 displays a result of authentication or a result of verification.

The memory 33 is a rewritable memory. The memory 33 is a RAM, for example. The memory 33 stores therein an authentication key, a verification key, verification data, and second reference data. The verification data is a plaintext or a ciphertext used for verification on the encryptor 21 or verification on the encryptor 24. The second reference data is a ciphertext generated by encrypting verification data with a verification key in advance when the verification data is a plaintext or is a plaintext generated by decrypting verification data with a verification key in advance when the verification data is a ciphertext.

Figure 2:
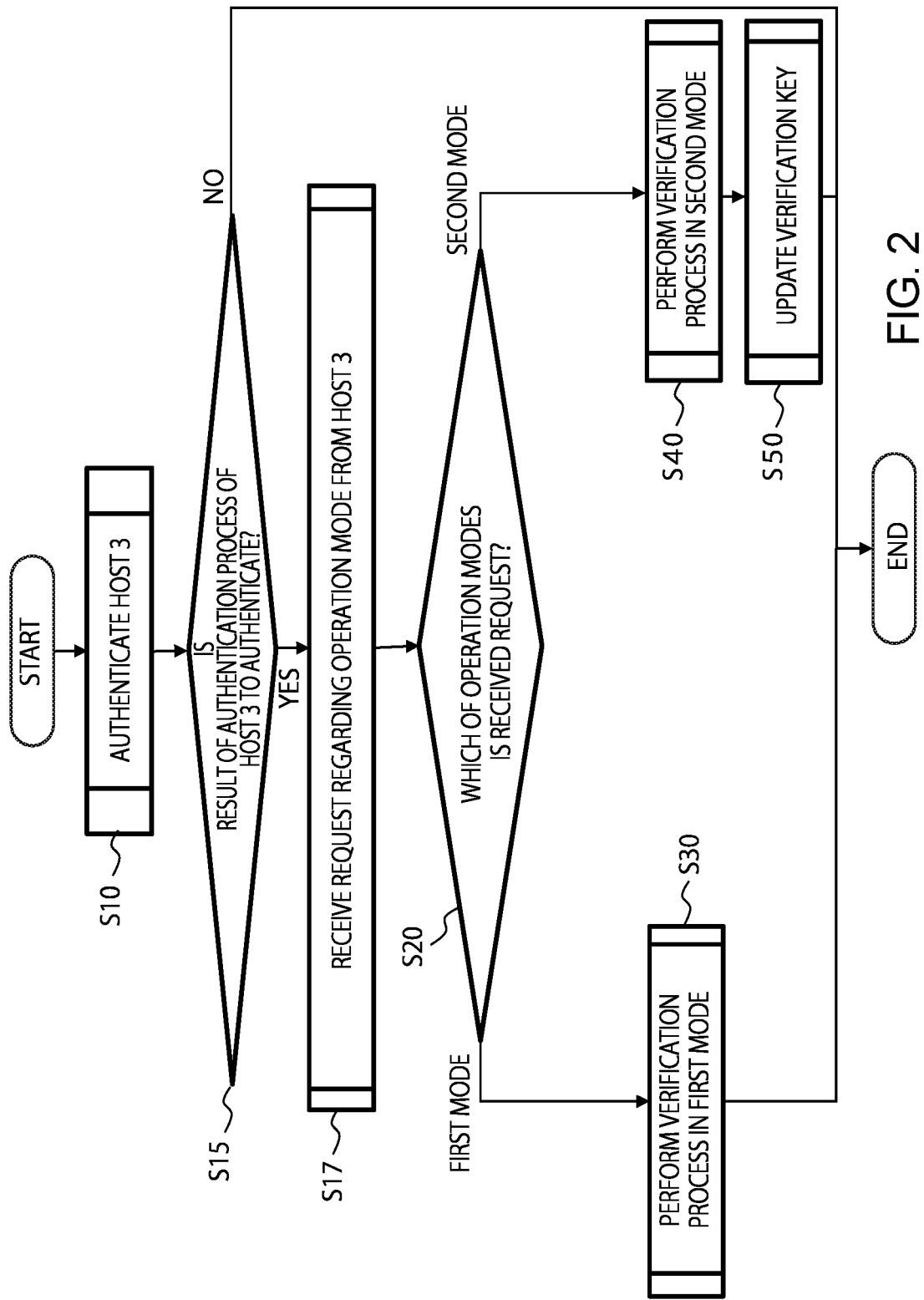
FIG. 2 is a flowchart illustrating an example of authentication on a host and of verification on an encryptor according to the first embodiment.

FIG. 2 is a flowchart illustrating an example of verification on the encryptor 21 and verification on the encryptor 24 according to the first embodiment.

Upon reception of a request regarding authentication from the host 3 in a state where the host 3 and the memory system 2 are connected to each other (START), the CPU 26 performs an authentication process of the host 3 (S10).

When the authentication process is ended, the CPU 26 determines whether the result of the authentication process of the host 3 is to authenticate (S15).

When the result of the authentication process is not to authenticate (NO at S15), the CPU 26 ends the series of processes in FIG. 2 (END).

When the result of the authentication process is to authenticate (YES at S15), the CPU 26 receives a request regarding an operation mode from the host 3 (S17).

The CPU 26 determines which of the operation modes the received request is (S20).

When the received request regarding an operation mode is a request regarding an operation in the first mode (FIRST MODE at S20), the CPU 26 performs a verification process in the first mode (S30). The verification process in the first mode is described later.

When the verification process in the first mode is ended, the CPU 26 ends the series of processes in FIG. 2 (END).

When the received request regarding an operation mode is a request regarding an operation in the second mode (SECOND MODE at S20), the CPU 26 performs a verification process in the second mode (S40). The verification process in the second mode is described later.

When the verification process in the second mode is ended, the CPU 26 updates the verification key (S50). Thereafter, the CPU 26 ends the series of processes in FIG. 2 (END). In the second mode, after verifying the encryptor 21 or the encryptor 24, the memory system 2 changes the encryption key held in the CPU 26 (S40). The encryption key held in the CPU 26 is transmitted to the host 3 for verification on the encryptor 21 or the encryptor 24. That is, after verifying the encryptor 21 or the encryptor 24, the host 3 is already informed of the encryption key and thus the encryption key is no longer a secret. Therefore, the memory system 2 changes the encryption key held in the CPU 26. By updating the encryption key, the encryption key having been transmitted to the host 3 becomes invalid. The changed encryption key may be used validly when an operation in the second mode is performed next time. Alternatively, the changed encryption key may be used validly for encrypting data to be stored in the main storage 23.

Figure 3:
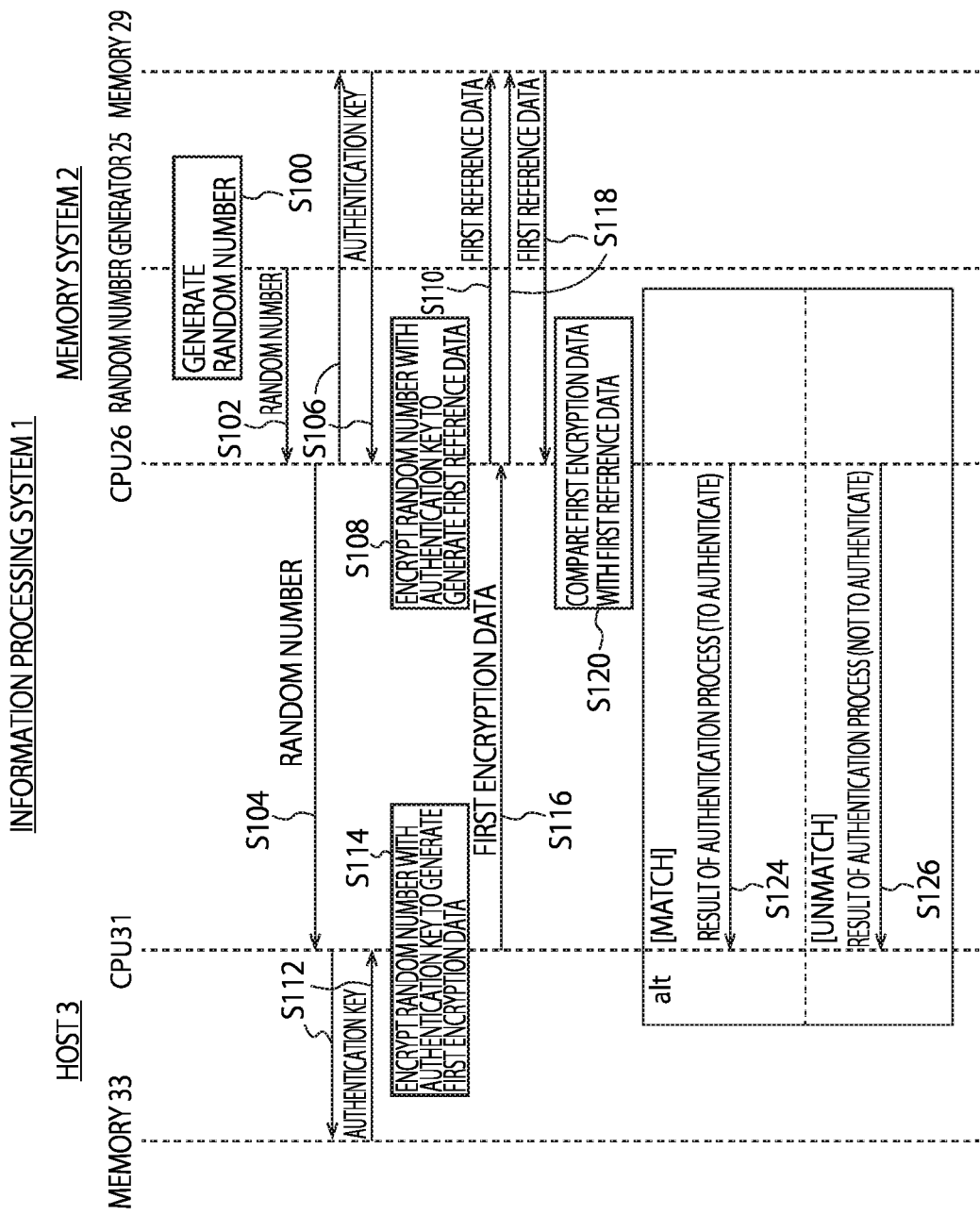
FIG. 3 is a sequence diagram illustrating an example of an authentication process according to the first embodiment.

FIG. 3 is a sequence diagram illustrating an example of the authentication process according to the first embodiment.

In the authentication process in the host 3, the random number generator 25 in the memory system 2 generates a random number (S100).

The random number generator 25 transmits the generated random number to the CPU 26 (S102).

The CPU 26 transmits the received random number to the CPU 31 in the host 3 (S104). Further, the CPU 26 reads an authentication key from the memory 29 (S106). The CPU 26 uses the read authentication key to encrypt the received random number, thereby generating first reference data (S108). The CPU 26 causes the memory 29 to store therein the first reference data (S110). Alternatively, the CPU 26 causes a memory or a cache separately provided in the CPU 26 to store therein the first reference data.

Upon reception of the random number, the CPU 31 in the host 3 reads an authentication key from the memory 33

(S112). The CPU 31 uses the read authentication key to encrypt the received random number, thereby generating first encryption data (S114). The CPU 31 then transmits the generated first encryption data to the memory system 2 (S116).

Upon reception of the first encryption data, the CPU 26 in the memory system 2 reads the first reference data from the memory 29 (S118). The CPU 26 then compares the received first encryption data with the first reference data (S120). Alternatively, the CPU 26 reads the first reference data from a memory or a cache separately provided in the CPU 26.

When the first encryption data and the first reference data match each other ([MATCH] at S120), the CPU 26 transmits the result of the authentication process as "TO AUTHENTICATE" to the CPU 31 in the host 3 (S124), and ends the series of processes in FIG. 3.

When the first encryption data and the first reference data do not match each other ([UNMATCH] at S120), the CPU 26 transmits the result of the authentication process as "NOT TO AUTHENTICATE" to the CPU 31 in the host 3 (S128), and ends the series of processes in FIG. 3.

(Verification of Encryption Function)

Figure 4:
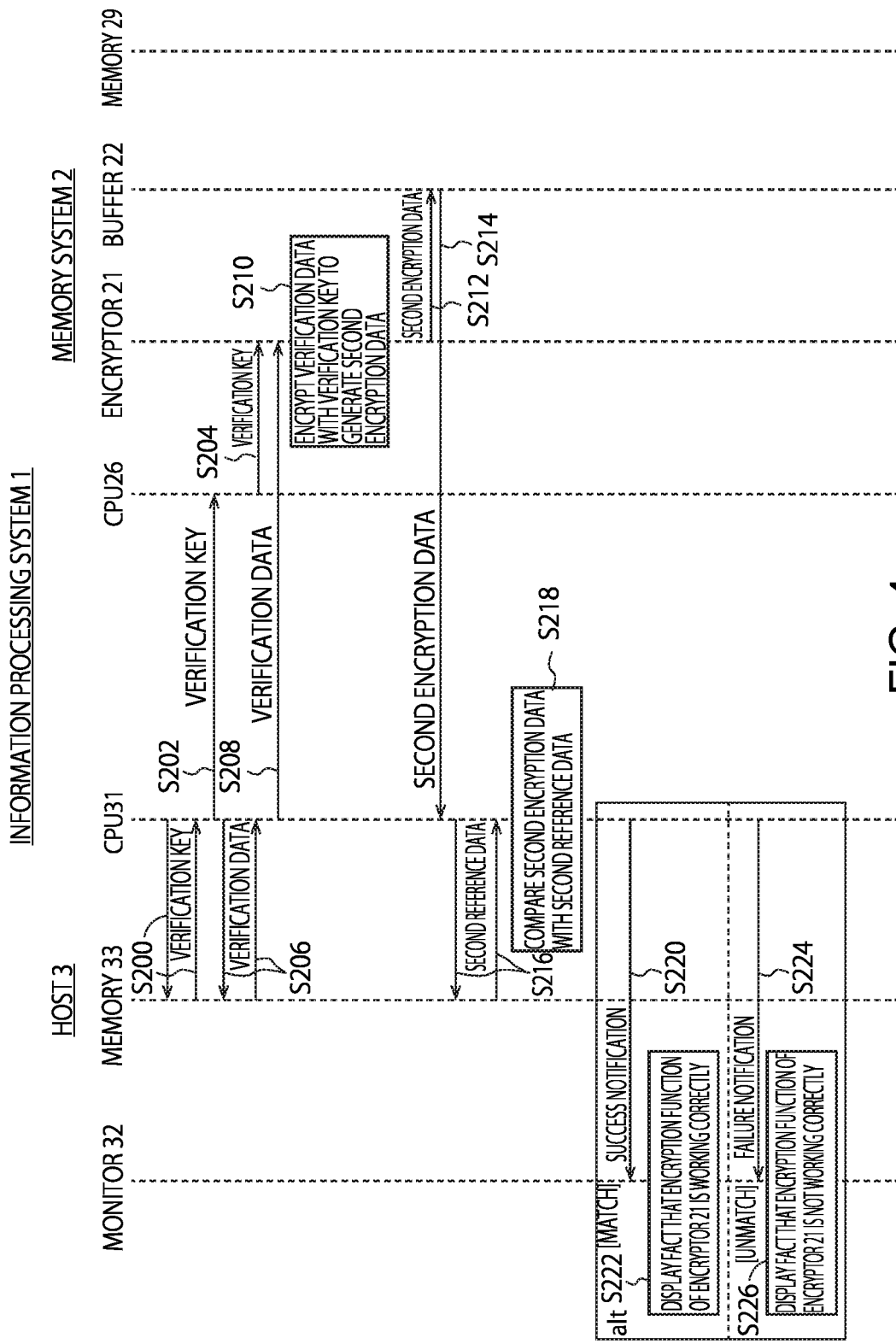
FIG. 4 is a sequence diagram illustrating an example of a verification process of an encryption function of an encryptor in a first mode according to the first embodiment.

FIG. 4 is a sequence diagram illustrating an example of a verification process of an encryption function of the encryptor in the first mode according to the first embodiment.

When the first mode is selected, the CPU 31 in the host 3 reads a verification key from the memory 33 (S200). The CPU 31 then transmits the read verification key to the memory system 2 (S202).

The CPU 26 in the memory system 2 transmits the received verification key to the encryptor 21 (S204).

Further, the CPU 31 in the host 3 reads verification data as a plaintext from the memory 33 (S206). The CPU 31 then transmits the read verification data to the encryptor 21 in the memory system 2 (S208).

The encryptor 21 uses the received verification key to encrypt the received verification data, thereby generating second encryption data (processing data) (S210). The encryptor 21 then transmits the generated second encryption data to the buffer 22 (S212).

The buffer 22 transmits the received second encryption data to the host 3 (S214).

Upon reception of the second encryption data, the CPU 31 in the host 3 reads second reference data as a ciphertext from the memory 33 (S216). The CPU 31 then compares the received second encryption data with the read second reference data (S218).

When the second encryption data and the second reference data match each other ([MATCH] at S218), the CPU 31 transmits a success notification to the monitor 32 (S220), and ends the series of processes in FIG. 4. Upon reception of the success notification, the monitor 32 displays a fact that the encryption function of the encryptor 21 in the memory system 2 is working correctly (S222).

When the second encryption data and the second reference data do not match each other ([UNMATCH] at S218), the CPU 31 transmits a failure notification to the monitor 32 (S224), and ends the series of processes in FIG. 4. Upon reception of the failure notification, the monitor 32 displays a fact that the encryption function of the encryptor 21 in the memory system 2 is not working correctly (S226).

The verification process of the encryptor 24 in the first mode may be performed similarly to the verification process of the encryptor 21 in the first mode.

Figure 5:
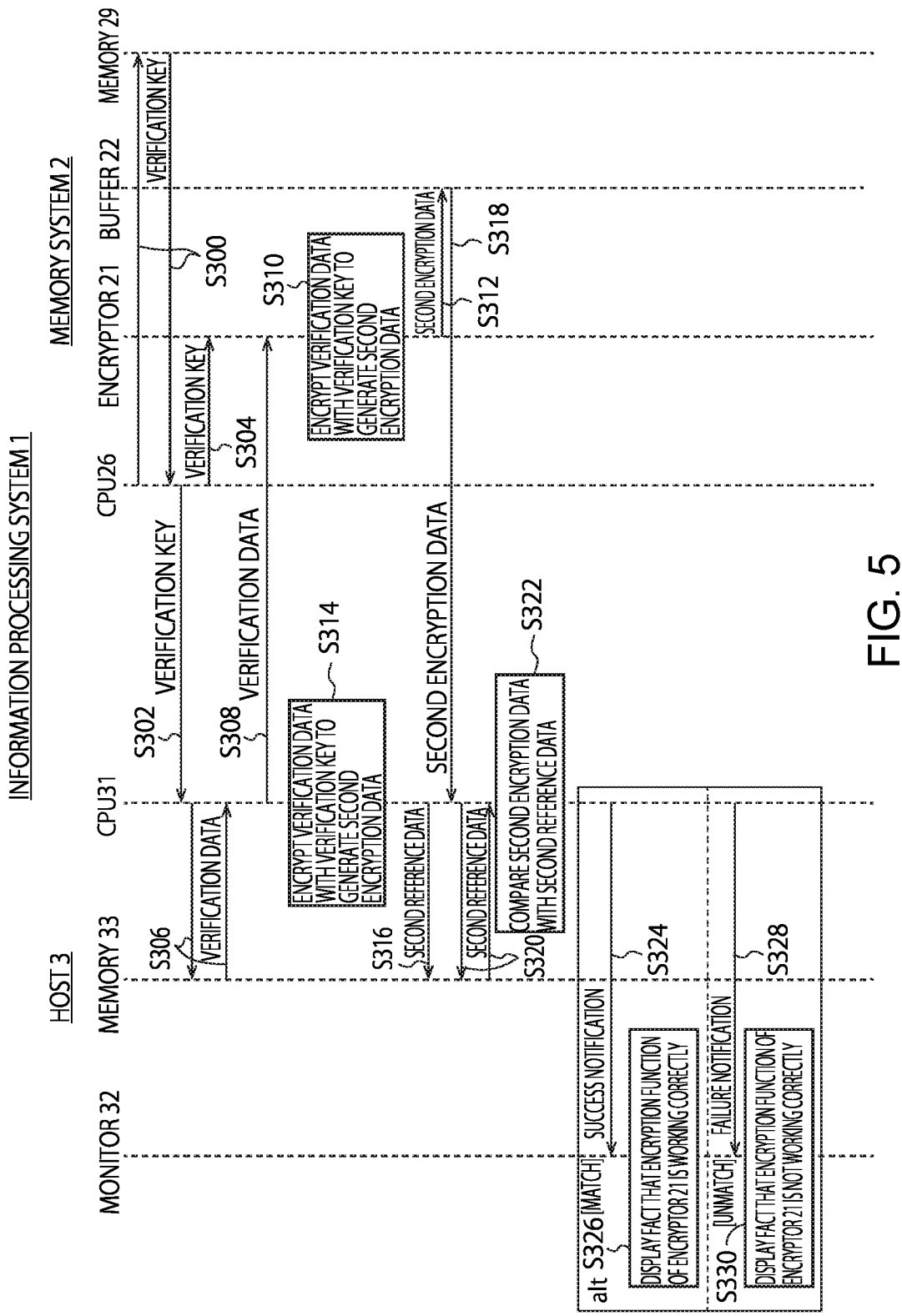
FIG. 5 is a sequence diagram illustrating an example of a verification process of an encryption function of an encryptor in a second mode according to the first embodiment.

FIG. 5 is a sequence diagram illustrating an example of a verification process of an encryption function of an encryptor in the second mode according to the first embodiment.

When the second mode is selected, the CPU 26 in the memory system 2 reads a verification key from the memory 29 (S300). The CPU 26 then transmits the read verification key to the host 3 (S302). Further, the CPU 26 transmits the read verification key to the encryptor 21 (S304).

Upon reception of the verification key from the CPU 26, the CPU 31 in the host 3 reads verification data as a plaintext from the memory 33 (S306). The CPU 31 then transmits the read verification data to the encryptor 21 in the memory system 2 (S308).

The encryptor 21 uses the received verification key to encrypt the received verification data, thereby generating second encryption data (first processing data) (S310). The encryptor 21 then transmits the second encryption data to the buffer 22 (S312).

The CPU 31 in the host 3 uses the received verification key to encrypt the verification data, thereby generating second reference data as a ciphertext (S314). The CPU 31 then transmits the generated second reference data to the memory 33 (S316).

The memory 33 stores therein the received second reference data.

The buffer 22 transmits the received second encryption data to the host 3 (S318).

Upon reception of the second encryption data, the CPU 31 in the host 3 reads the second reference data from the memory 33 (S320). The CPU 31 then compares the received second encryption data with the read second reference data (S322).

When the second encryption data and the second reference data match each other ([MATCH] at S322), the CPU 31 transmits a success notification to the monitor 32 (S324), and ends the series of processes in FIG. 5. Upon reception of the success notification, the monitor 32 displays a fact that the encryption function of the encryptor 21 in the memory system 2 is working correctly (S326).

When the second encryption data and the second reference data do not match each other ([UNMATCH] at S322), the CPU 31 transmits a failure notification to the monitor 32 (S328), and ends the series of processes in FIG. 5. Upon reception of the failure notification, the monitor 32 displays a fact that the encryption function of the encryptor 21 in the memory system 2 is not working correctly (S330).

The verification process of the encryptor 24 in the second mode may be performed similarly to the verification process of the encryptor 21 in the second mode.

Figure 6:
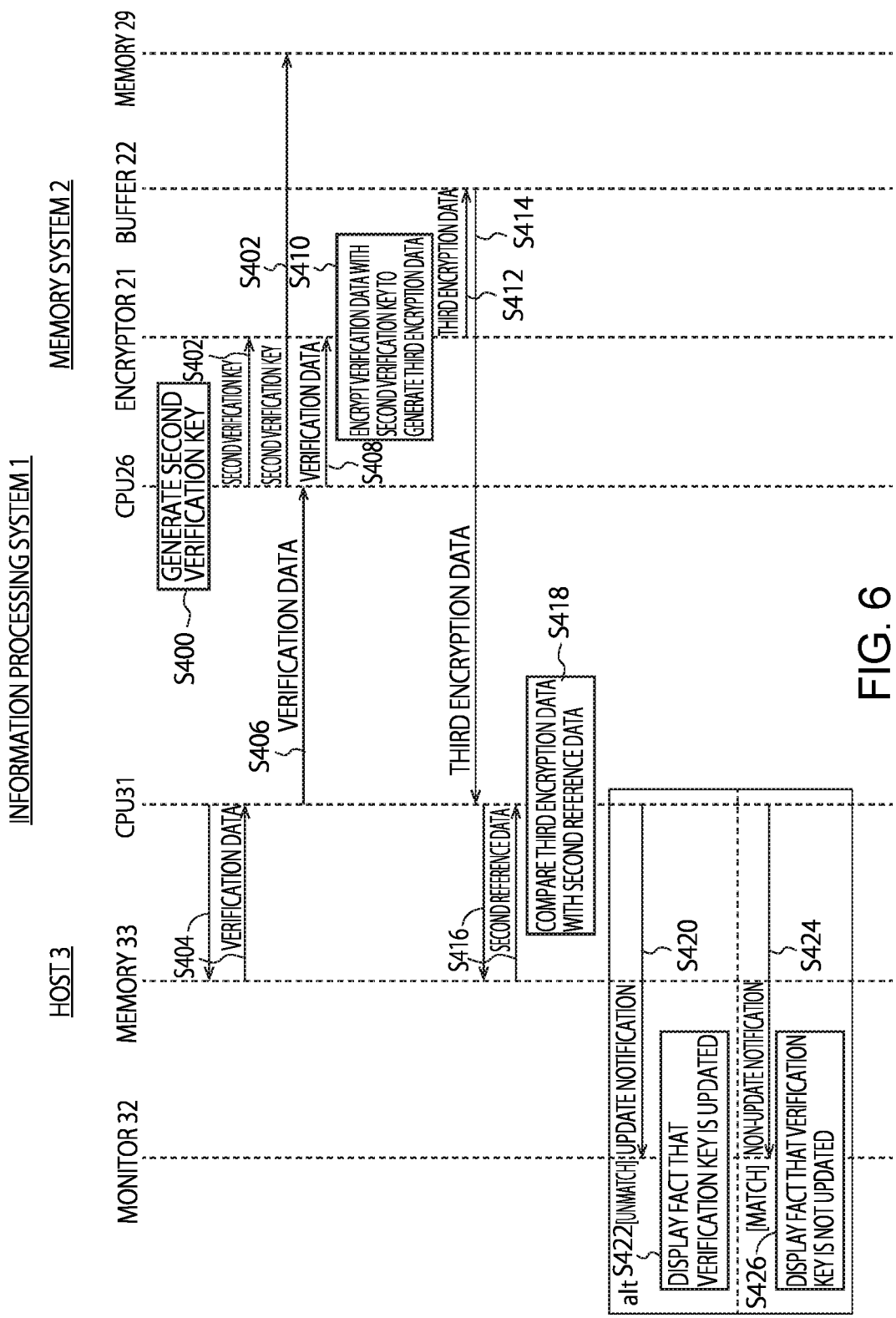
FIG. 6 is a sequence diagram illustrating an example of an updating process of a verification key according to the first embodiment.

FIG. 6 is a sequence diagram illustrating an example of an updating process of a verification key according to the first embodiment.

After verifying the encryptor 21 and the encryptor 24 in the second mode, the CPU 26 in the memory system 2 updates the verification key. The CPU 26 generates a second verification key different from the existing verification key (S400). The CPU 26 transmits the second verification key to the encryptor 21 and the memory 29 (S402). The verification key stored in the memory 29 is updated with the second verification key.

After verifying the encryptor 21 and the encryptor 24, the CPU 31 in the host 3 reads verification data as a plaintext from the memory 33 (S404). The CPU 31 then transmits the read verification data to the memory system 2 (S406).

The CPU 26 in the memory system 2 transmits the received verification data to the encryptor 21 (S408).

The encryptor 21 encrypts the received verification data with the received second verification key to generate third encryption data (second processing data) (S410). The encryptor 21 then transmits the third encryption data to the buffer 22 (S412).

The buffer 22 transmits the received third encryption data to the host 3 (S414).

Upon reception of the third encryption data, the CPU 31 in the host 3 reads second reference data as a ciphertext from the memory 33 (S416). The CPU 31 then compares the received third encryption data with the second reference data (S418).

When the third encryption data and the second reference data do not match each other ([UNMATCH] at S418), the CPU 31 transmits an encryption key update notification to the monitor 32 (S420), and ends the series of processes in FIG. 6. Upon reception of the update notification, the monitor 32 displays a fact that the verification key is updated (S422).

When the third encryption data and the second reference data match each other ([MATCH] at S418), the CPU 31 transmits a non-update notification to the monitor 32 (S424), and ends the series of processes in FIG. 6. Upon reception of the non-update notification, the monitor 32 displays a fact that the verification key is not updated (S426).

When the verification key stored in the memory 29 in the memory system 2 is once output to outside of the memory system 2, the verification key is no longer a secret. In this case, it is not possible to keep secure for the data in the memory system 2. Therefore, after verifying the encryptor 21 and the encryptor 24 in the second mode, the CPU 26 updates the verification key stored in the memory 29 to be another second verification key. By updating the verification key, the verification key having been transmitted to the host 3 becomes invalid. Accordingly, the security of data in the memory system 2 can be maintained. The second verification key may be used validly when an operation in the second mode is performed next time. Alternatively, the second verification key may be used validly for encrypting data to be stored in the main storage 23.

(Verification of Decryption Function)

Figure 7:
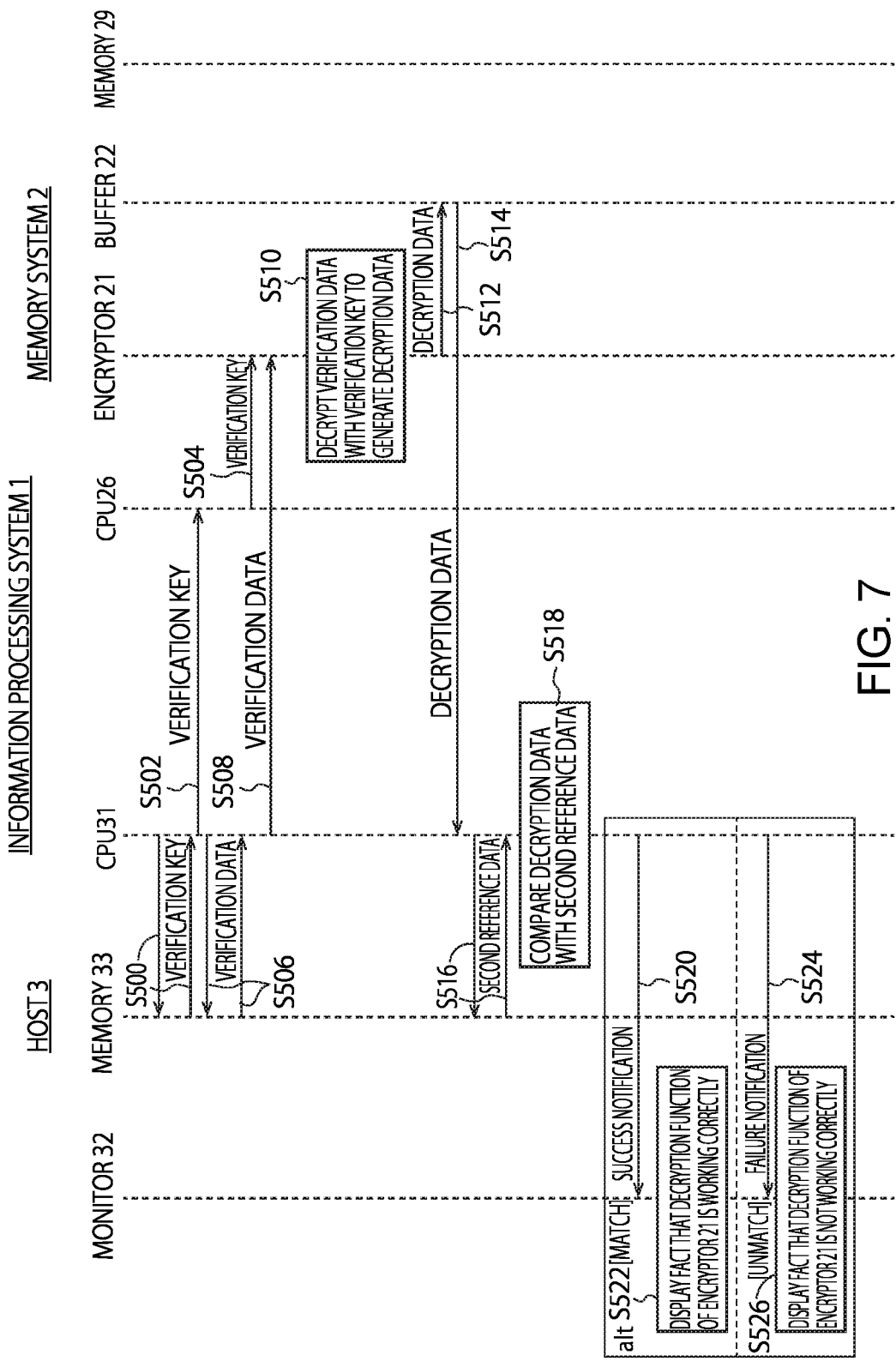
FIG. 7 is a sequence diagram illustrating an example of a verification process of a decryption function of the encryptor in the first mode according to the first embodiment.

FIG. 7 is a sequence diagram illustrating an example of a verification process of a decryption function of the encryptor in the first mode according to the first embodiment.

When the first mode is selected, the CPU 31 in the host 3 reads a verification key from the memory 33 (S500). The CPU 31 then transmits the read verification key to the memory system 2 (S502).

The CPU 26 in the memory system 2 transmits the received verification key to the encryptor 21 (S504).

Further, the CPU 31 in the host 3 reads verification data as a ciphertext from the memory 33 (S506). The CPU 31 then transmits the read verification data to the encryptor 21 in the memory system 2 (S508).

The encryptor 21 uses the received verification key to decrypt the received verification data, thereby generating decryption data (processing data) (S510). The encryptor 21 then transmits the generated decryption data to the buffer 22 (S512).

The buffer 22 transmits the received decryption data to the host 3 (S514).

Upon reception of the decryption data, the CPU 31 in the host 3 reads second reference data as a plaintext from the memory 33 (S516). The CPU 31 then compares the received decryption data with the read second reference data (S518).

When the decryption data and the second reference data match each other ([MATCH] at S518), the CPU 31 transmits a success notification to the monitor 32 (S520), and ends the series of processes in FIG. 7. Upon reception of the success notification, the monitor 32 displays a fact that the decryption function of the encryptor 21 in the memory system 2 is working correctly (S522).

When the decryption data and the second reference data do not match each other ([UNMATCH] at S518), the CPU 31 transmits a failure notification to the monitor 32 (S524), and ends the series of processes in FIG. 7. Upon reception of the failure notification, the monitor 32 displays a fact that the decryption function of the encryptor 21 in the memory system 2 is not working correctly (S526).

The verification on the encryptor 24 in the memory system 2 may be performed similarly to the verification on the encryptor 21.

Figure 8:
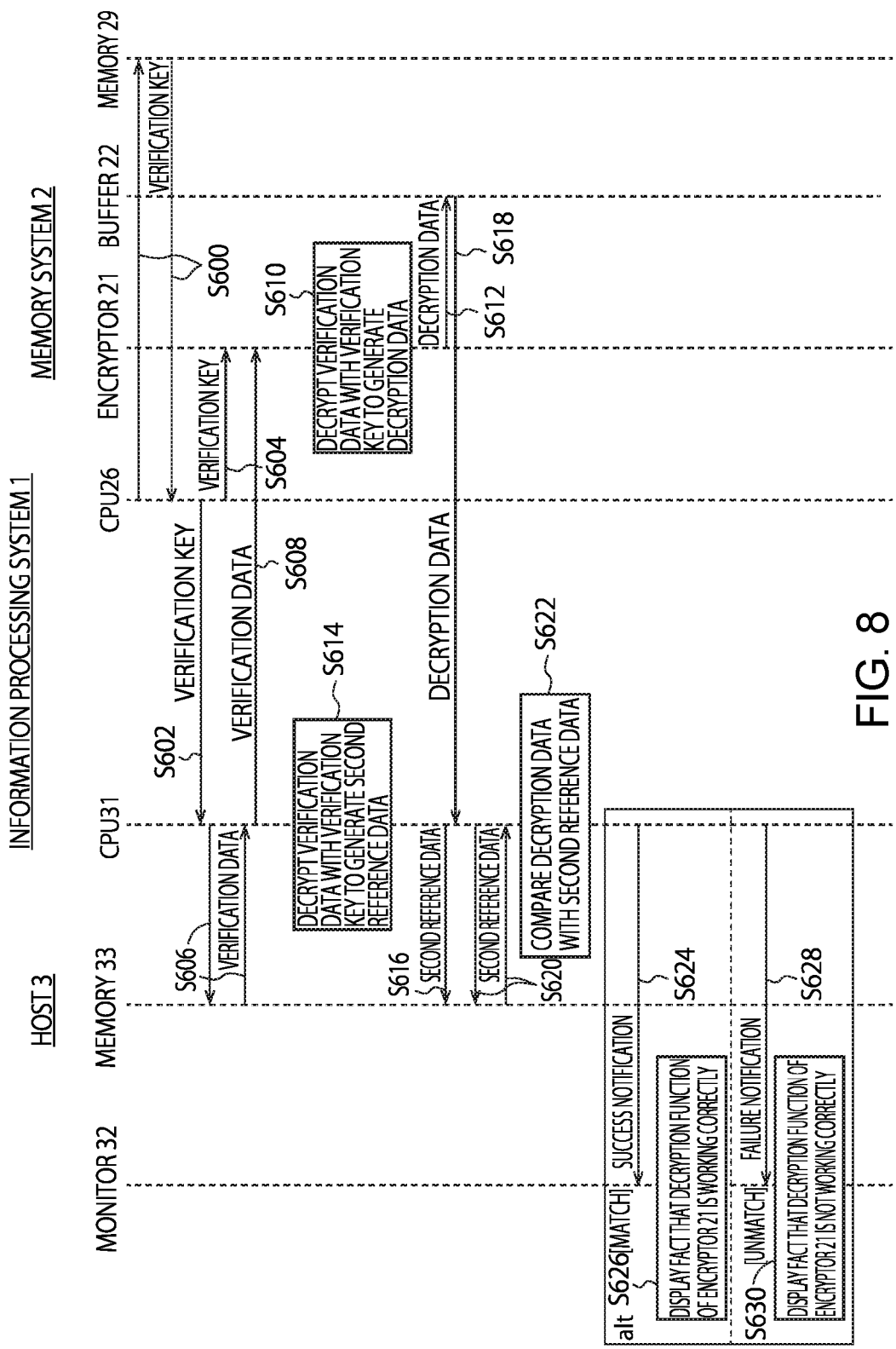
FIG. 8 is a sequence diagram illustrating an example of a verification process of a decryption function of the encryptor in the second mode according to the first embodiment.

FIG. 8 is a sequence diagram illustrating an example of a verification process of a decryption function of the encryptor in the second mode according to the first embodiment.

When the second mode is selected, the CPU 26 in the memory system 2 reads a verification key from the memory 29 (S600). The CPU 26 then transmits the read verification key to the host 3 (S602). Further, the CPU 26 transmits the read verification key to the encryptor 21 (S604).

Upon reception of the verification key from the CPU 26, the CPU 31 in the host 3 reads verification data as a plaintext from the memory 33 (S606). The CPU 31 then transmits the read verification data to the encryptor 21 in the memory system 2 (S608).

The encryptor 21 uses the received verification key to decrypt the received verification data, thereby generating decryption data (first processing data) (S610). The encryptor 21 then transmits the decryption data to the buffer 22 (S612).

The CPU 31 in the host 3 uses the received verification key to decrypt the verification data, thereby generating second reference data as a plaintext (S614). The CPU 31 then transmits the generated second reference data to the memory 33 (S616).

The memory 33 stores therein the second reference data.

The buffer 22 transmits the received decryption data to the host 3 (S618).

Upon reception of the decryption data, the CPU 31 in the host 3 reads the second reference data from the memory 33 (S620). The CPU 31 then compares the received decryption data with the read second reference data (S622).

When the decryption data and the second reference data match each other ([MATCH] at S622), the CPU 31 transmits a success notification to the monitor 32 (S624), and ends the series of processes in FIG. 8. Upon reception of the success notification, the monitor 32 displays a fact that the decryption function of the encryptor 21 in the memory system 2 is working correctly (S626).

When the decryption data and the second reference data do not match each other ([UNMATCH] at S622), the CPU 31 transmits a failure notification to the monitor 32 (S628), and ends the series of processes in FIG. 8. Upon reception of the failure notification, the monitor 32 displays a fact that the decryption function of the encryptor 21 in the memory system 2 is not working correctly (S630).

The updating process of the verification key after the verification process in the second mode is the same as the updating process of the verification key described above with reference to FIG. 6.

According to the first embodiment, the information processing system 1 can perform verification of the encryption function on the encryptor 21 in the memory system 2 with the verification key held in the memory 33 in the host 3. That is, the host 3 can test the encryption function of the encryptor 21 inside the memory system 2 from outside of the memory system 2.

According to the first embodiment, a user can identify that the encryption function of the encryptor 21 is working correctly or not working correctly by referring to the monitor 32 in the host 3.

According to the first embodiment, the host 3 can test the encryption function of both the encryptor 21 and the encryptor 24 in the memory system 2 from outside of the memory system 2 with the verification key stored in the memory 33.

According to the first embodiment, the host 3 of the information processing system 1 can perform verification of the encryption function on the encryptor 21 in the memory system 2 with the verification key received from the memory system 2. That is, even in the second mode, the host 3 can test the encryption function of the encryptor 21 inside the memory system 2 from outside of the memory system 2.

According to the first embodiment, the host 3 can test the encryption function of both the encryptor 21 and the encryptor 24 inside the memory system 2 from outside of the memory system 2 with the verification key received from the memory system 2.

According to the first embodiment, a user can identify that the verification key has been updated or has not been updated by referring to the monitor 32 in the host 3.

According to the first embodiment, the information processing system 1 can perform verification of the decryption function on the encryptor 21 in the memory system 2 with the verification key held in the memory 33 in the host 3. That is, the host 3 can test the decryption function of the encryptor 21 inside the memory system 2 from outside of the memory system 2.

According to the first embodiment, a user can identify that the decryption function of the encryptor 21 is working correctly or not working correctly by referring to the monitor 32 in the host 3.

According to the first embodiment, the host 3 of the information processing system 1 can perform verification of the decryption function on the encryptor 21 in the memory system 2 with the verification key received from the memory system 2. That is, even in the second mode, the host 3 can test the decryption function of the encryptor 21 in the memory system 2 from outside of the memory system 2.

According to the first embodiment, a user can identify that the decryption function of the encryptor 21 is working correctly or not working correctly by referring to the monitor 32 in the host 3.

According to the first embodiment, the verification on the encryptor 24 in the memory system 2 may be performed similarly to the verification on the encryptor 21. Accordingly, the host 3 can test the decryption function of both the encryptor 21 and the encryptor 24 in the memory system 2 from outside of the memory system 2 with the verification key received from the memory system 2.

The information processing system 1 according to the first embodiment can perform not only verification of the encryption function on the encryptors 21 and 24 but also verification of the decryption function on the encryptors 21 and 24.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing system comprising
a memory system and a host communicably connected to the memory system, wherein
the memory system comprises:
an encryptor configured to encrypt or decrypt data;
a random number generator configured to generate a random number; and
a first memory configured to store therein an authentication key,
the host comprises a second memory configured to store therein the authentication key, a verification key as an encryption key, verification data as a plaintext or a ciphertext, and second reference data generated by encrypting or decrypting the verification data with the verification key,
the memory system
transmits the random number to the host,
decrypts the random number with the authentication key in order to generate first reference data,
transmits a result of an authentication process to the host and receives a request regarding an operation mode from the host, when received first encryption data and the first reference data match each other,
encrypts or decrypts received verification data with received verification key in order to generate processing data, and
transmits the generated processing data to the host, and
the host
encrypts the received random number with the authentication key in order to generate the first encryption data,
transmits the generated first encryption data to the memory system,
transmits a request regarding an operation in a first mode to the memory system and transmits the verification key and the verification data read from the second memory to the memory system, when the host received a result of the authentication process,
and
generates a success notification indicating that the encryptor is working correctly when the received processing data and the second reference data match each other.

2. The system of claim 1, wherein
the memory system authenticates the result of the authentication process of the host when the first encryption data and the first reference data match each other, and
the memory system does not authenticate the result of the authentication process of the host when the first encryption data and the first reference data do not match each other.

3. The system of claim 1, wherein the host generates a failure notification indicating that an encryption function of the encryptor is not working correctly when the received processing data and the second reference data do not match each other.

4. The system of claim 2, wherein the host generates a failure notification indicating that an encryption function of the encryptor is not working correctly when the received processing data and the second reference data do not match each other.

5. An information processing system comprising
a memory system and a host communicably connected to the memory system, wherein
the memory system comprises:
an encryptor configured to encrypt or decrypt data;
a random number generator configured to generate a random number; and a first memory configured to store therein a first verification key as an encryption key, the host comprises a second memory configured to store therein an authentication key and verification data as a plaintext or a ciphertext, the memory system transmits the random number to the host, decrypts the random number with the authentication key in order to generate first reference data, transmits a result of an authentication process to the host and receives a request regarding an operation mode from the host, when received first encryption data and the first reference data match each other, transmits the first verification key to the encryptor and the host, encrypts or decrypts the received verification data with the first verification key in order to generate first processing data, and transmits the generated first processing data to the host, and the host encrypts the received random number with the authentication key in order to generate the first encryption data, transmits the generated first encryption data to the memory system, transmits a request regarding an operation in a second mode to the memory system upon reception of a result of the authentication process, encrypts or decrypts the verification data with the received first verification key in order to generate second reference data, and generates a success notification indicating that the encryptor is working correctly when the received first processing data and the second reference data match each other.

6. The system of claim 5, wherein the memory system authenticates the result of the authentication process of the host when the first encryption data and the first reference data match each other, and the memory system does not authenticate the result of the authentication process of the host when the first encryption data and the first reference data do not match each other.

7. The system of claim 5, wherein the host generates a failure notification indicating that an encryption function of the encryptor is not working correctly when the received processing data and the second reference data do not match each other.

8. The system of claim 6, wherein the host generates a failure notification indicating that an encryption function of the encryptor is not working correctly when the received processing data and the second reference data do not match each other.

9. The system of claim 5, wherein the memory system generates a second verification key as an encryption key, transmits the second verification key to the first memory and the encryptor, encrypts or decrypts received second verification data with the second verification key in order to generate second processing data, and transmits the second processing data to the host, and the host transmits the second verification data to the memory system, and generates an update notification indicating that the first verification key has been updated to be the second verification key when the received second processing data is different from the second reference data.

10. The system of claim 5, wherein the host generates a non-update notification indicating that the first verification key has not been updated to be the second verification key when the received second processing data and the second reference data match each other.

11. A memory system comprising:

an encryptor configured to encrypt or decrypt data;

a random number generator configured to generate a random number; and a first memory configured to store therein an authentication key, the memory system transmits the random number to a host that is connected to the memory system, decrypts the random number with an authentication key received from the host in order to generate first reference data, transmits a result of an authentication process to the host and receives a request regarding an operation mode from the host, when received first encryption data from the host and the first reference data match each other, encrypts or decrypts received verification data from the host by using received verification key from the host in order to generate processing data, and transmits the generated processing data to the host.

12. The system of claim 11, wherein the memory system authenticates the result of the authentication process of the host when the first encryption data and the first reference data match each other, and the memory system does not authenticate the result of the authentication process of the host when the first encryption data and the first reference data do not match each other.

* * * * *